United States Patent Office 3,520,375
Patented July 14, 1970

3,520,375
METHOD AND APPARATUS FOR MEASURING MECHANICAL CHARACTERISTICS OF ROCKS WHILE THEY ARE BEING DRILLED
Jean Raynal, Serge Gstalder, Claude Quichaud, and Michel Raynaud, Pau, France, assignors to Société Nationale des Petroles d'Aquitaine, Coubevoie, France, a corporation of France
Filed Mar. 19, 1969, Ser. No. 808,633
Int. Cl. E21b 47/00, 49/00
U.S. Cl. 175—24
12 Claims

ABSTRACT OF THE DISCLOSURE

A method is provided for continuously measuring the characteristics of geological formations (in particular rock formations) which are being drilled at the actual moment of drilling, in particular during the drilling of oil and gas wells and the like. The drilling assembly used has a rotary cutting tool at its lower part, in the drill-hole, the rock-breaking action of which sets up vibrations in the drilling assembly which are detected at the upper part of the assembly and transformed into electrical signals. These signals are sampled and compared with a reference signal, so as to give an indication of the mechanical properties of the rock. Novel electronic means are also provided, as part of drilling apparatus, to enable the above-mentioned method to be carried out, and also a method of automatic drilling in which devices which determine the parameters of the drilling operation are controlled in response to variation in the mechanical properties of the rock as measured in the manner referred to above.

---

Figure 1:
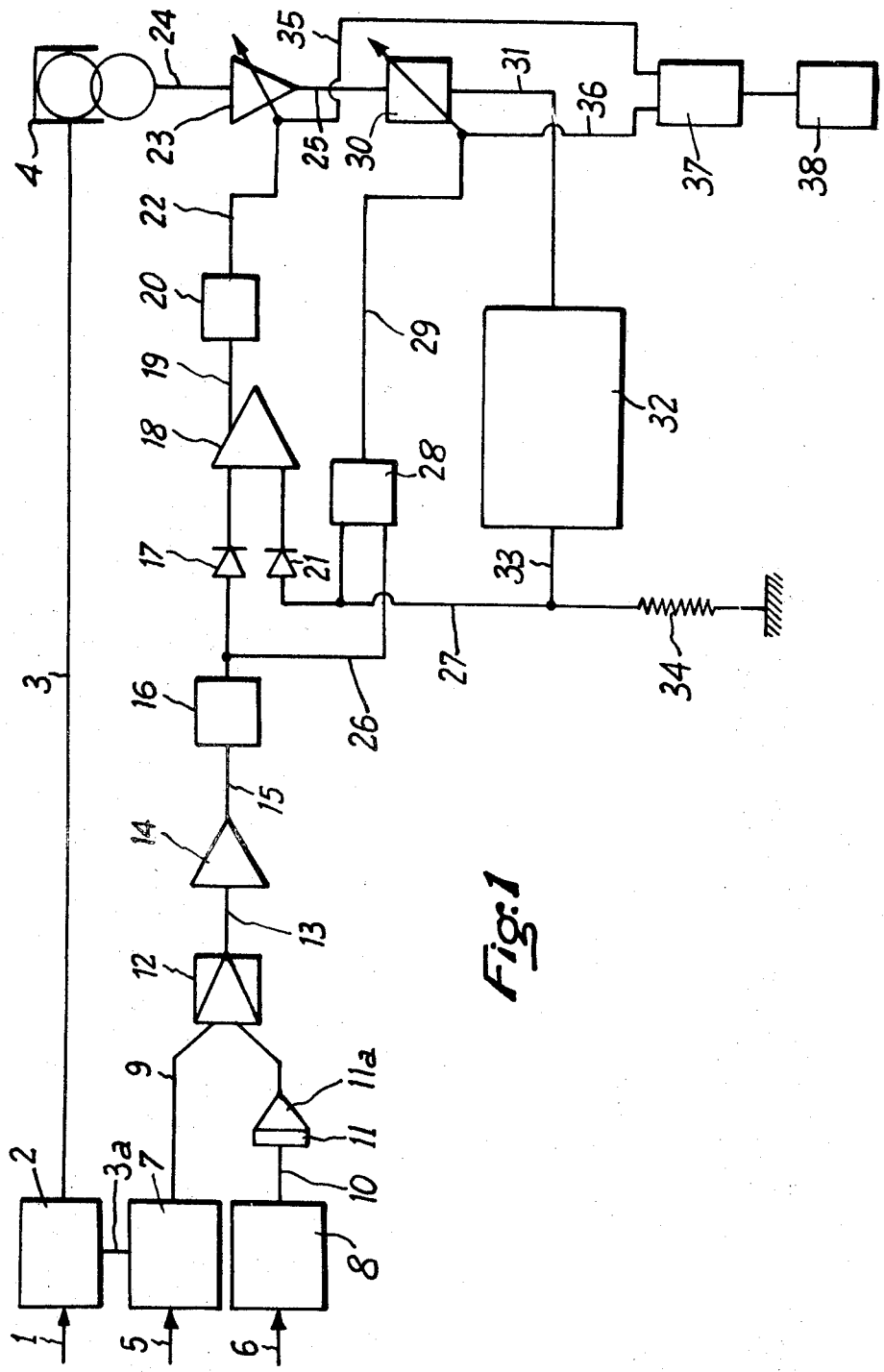

The present invention relates to a method of continuously measuring the characteristics of geological formations which are being drilled, at the actual moment of drilling, in particular during the drilling of oil and gas wells and the like. The invention also relates to apparatus for carrying out this method and to the application of the method to the regulation of the parameters imposed on the drilling tool.

The invention is particularly applicable to the drilling of rock formations but it is to be understood that although the term "rock" is used hereinafter, the invention is applicable to the drilling of geological formations in general.

Hitherto, the measurement of the characteristics of rock has been carried out subsequently to the drilling operations. Such measurement may be undertaken either on the basis of rock samples taken at the time of drilling, and possibly placed under conditions approximating to the conditions in which they were found at the bottom of the drill-hole, or in situ, after withdrawal of the drilling equipment, by means of diagraphs, for example acoustic diagraphs.

Wheel-type tools work on the working face of a drill-hole by percussion, the rotation of the wheel from one tooth to the following tooth ensuring the destruction of the rock. The vibratory energy thus emitted by the drilling tool is distributed along two paths; the first path is formed by the rock, in which the transmitted energy serves for the destruction thereof; the second circuit is formed by the mechanical assembly comprising the drilling tool, the drill collars and drilling rods, which together will be referred to as the drilling assembly, and the suspension system for the said drilling assembly. A signal can thus be observed at the top of the drilling assembly, for example by means of pick-ups which detect stress and acceleration.

The vibrations observed on the surface are the product of the chain of vibrations originating from the working face of the transfer function of the drilling assembly.

One of the objects of the present invention is to provide a method which will enable one to derive from this signal, data on the mechanical characteristics of the rock which is attacked by the tool.

Another object of the present invention is to provide a method which will enable one to utilise the data which is collected, for placing the drilling parameters under the control of certain mechanical characteristics of the rock attacked by the tool.

The method according to the present invention comprises collecting at the upper part of the drilling assembly at least one signal which is representative of the vibrations of the upper part of the drilling assembly, selecting from the said one signal a fraction thereof in a definite pass band, generating a second signal of like nature to the said one signal and varying with the speed of rotation of the drilling assembly, comparing the said second signal with the said one signal while adjusting the second signal until the signal representing the difference is cancelled out, and measuring at least one characteristic of the said second signal, which characteristic is connected with the mechanical properties of the rock being drilled and which serves for the control of the drilling parameters.

According to one feature of the present invention, the said second signal is generated by forming a sinusoidal value of multiple frequency from the speed of rotation of the drilling assembly and controlling, by means of the said value, a generator delivering a value of which the amplitude is proportional to the frequency, amplifying the amplitude value which is proportional to the frequency by means of an adjustable gain amplifier, regulating the phase of the amplified value by means of an adjustable phase-shift member, applying the resulting value to the input of a network formed of modules arranged in series and each comprising elements constituting a resonant circuit, and multiplying the signal entering the said network by the transfer function of the said network.

In accordance with one mode of carrying out the method according to the present invention, the signal received at the upper part of the drilling assembly is an electric signal.

According to a preferred mode of carrying out the method of the present invention, there are received at the upper part of the drilling assembly, simultaneously but nevertheless independently of one another, a signal which represents the stresses set up in the upper part of the drilling assembly by the vibrations of the latter and a signal representing the accelerations resulting from vibrations of the upper part of the drilling assembly, in each of these two signals there is selected a fraction of the said signals having the same pass band, the means frequency of this pass band being a multiple of the frequency associated with the speed of rotation of the drilling assembly, the partial signal representing the accelerations is integrated, thus obtaining a partial signal representing the speed of displacement, this partial signal is amplified and the amplified partial signal is added to the partial signal derived from the signal representing the stress, which will be called the force signal, the resulting signal is amplified in an amplifier having a given gain and is shifted in phase, the amplitude of the resultant signal is compared in an amplitude comparator with the amplitude of the signal generated as indicated above, yielding a difference signal, the difference signal is applied to an integrator, the integrated difference signal is used for controlling the adjustable gain amplifier, the resultant signal phase is compared in a phase comparator with the phase of the signal generated as indicated above, the difference signal is used for regulating the adjustable phase-shift member and the gain of the adjustable gain amplifier and the shift in phase of the phase-shift member are measured independently.

In a modification of this procedure, pick-ups or strain gauges collecting the signal representing the stresses or strains are positioned at the upper part of the drilling assembly above the rotatable driving table or platform and comprise two gauges having a vertical axis and two gauges having a horizontal axis, the mounting being effected in the form of a complete bridge for measuring longitudinal vibrations only, whereas the pick-ups receiving the signal representing the accelerations are placed in the vicinity of the first pick-ups, the mounting in this case being effected in a differential manner and the axis of the said pickups being parallel to the axis of the drilling assembly.

In another modification of this procedure, the pick-ups receiving the signal representing the stresses are placed at the upper part of the drilling assembly below the rotary driving table or platform and are formed by four gauges inclined at 45° to the axis of the drilling assembly, the mounting being effected as a complete bridge, while the pick-ups receiving the signal representing the accelerations are positioned in the vicinity of the first pick-ups, the mounting being effected in a differential manner and the axis of the said pick-ups being perpendicular to the axis of the drilling assembly.

In a more highly developed form of this procedure, the measurement of the amplifier gain and the measurement of the shift in phase are combined, so that the resultant measurement is a measure of the impedance of the rock.

The invention is also concerned with apparatus for carrying the above method into effect, such apparatus comprising an alternating voltage generator controlled by pulses and delivering an alternating voltage with a frequency which is a multiple of the number of pulses received per second, the frequency of the said generator controlling two filters having the same pass band, a current generator controlled by the alternating voltage generator and delivering a current proportional to the frequency, a variable gain amplifier amplifying the said current, an adjustable phase-shift device for altering the phase of the said amplified current, a delay line multiplying the said amplified and dephased current by a transfer function which is adjustable as a function of the geometrical parameters of the drilling assembly, comparison members receiving, on the one hand, the voltage leaving the delay line and, on the other hand, a voltage established from the voltages received by the pick-ups at the upper part of the drilling assembly, the said voltage being established by simultaneous filtering of the two voltages which are collected by the filters under the control of the alternating voltage generator, one or other of the collected and filtered voltages being applied to an integrator and to an amplifier, and an adding unit receiving the second collected voltage and filtered voltage originating from the second pick-up, the said adding unit being followed by an amplifier and a phase-shift device.

In one preferred embodiment of the arrangement according to the invention, the generated voltage is compared with a voltage established from the voltages collected by the strain gauges and the acceleration pick-ups.

In a modification of this arrangement, the strain gauges and the acceleration pick-ups are positioned at the upper part of the drilling assembly above a rotary table, the said pick-ups being arranged in such a manner that the longitudinal accelerations and the stresses or strains are obtained.

In another modification of this embodiment, the stress pick-ups and the acceleration pick-ups are placed at the upper part of the drilling assembly below the rotary table, the said pick-ups being positioned in such a manner that the stresses and torsional accelerations are detected.

Figure 2:
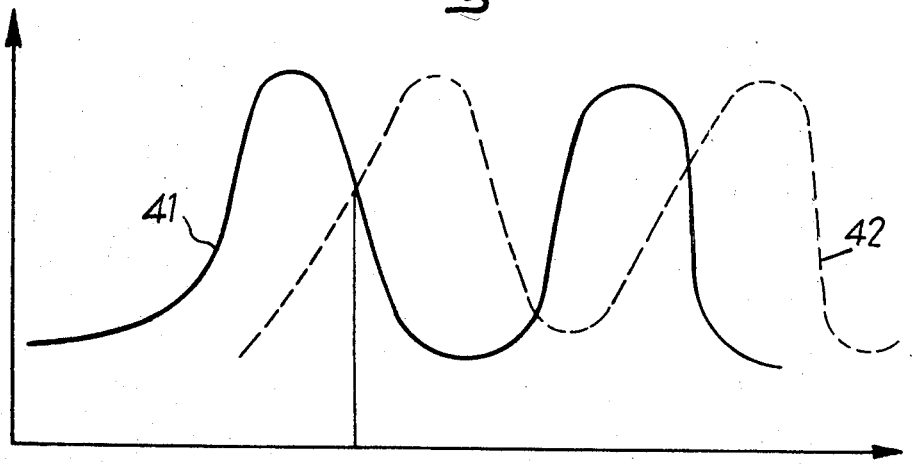
Figure 3:
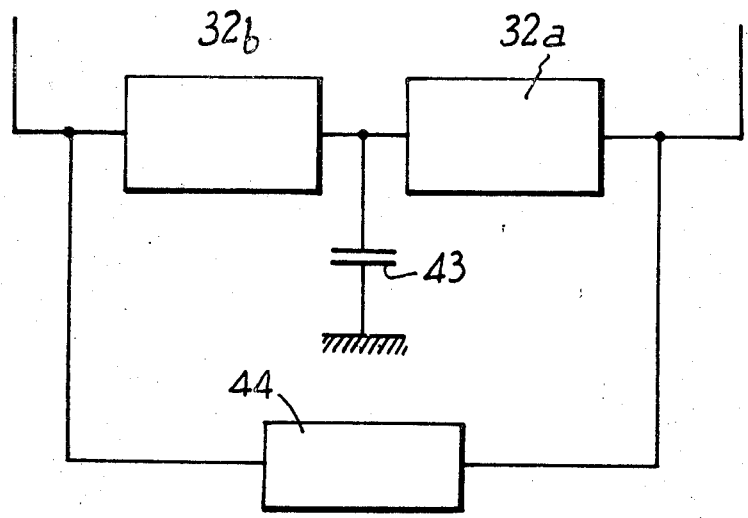

The invention will be more fully understood from the following description, given by way of example only, of one constructional form of apparatus for carrying the method of the invention into effect, together with different applications of the apparatus. The description is illustrated by the accompanying drawings, in which:

FIG. 1 represents diagrammatically one embodiment of apparatus according to the invention;

FIG. 2 shows curves representing variations in the amplitude of the vibrations received at the top of the drilling assembly, as a function of the frequency of the speed of rotation, for rocks having different mechanical characteristics, and FIG. 3 represents diagrammatically, a delay line which forms part of the apparatus of FIG. 1, in which there has been incorporated a tool of resilient behaviour.

Referring to FIG. 1, 1 represents the point of arrival of pulses originating from a proximity detector placed in the vicinity of the driving shaft of the drilling assembly. This proximity detector can be replaced by any other form of tachometric measuring device.

A given number of pulses reaches 1 each time that the driving shaft makes one rotation. 2 is a piloted alternating voltage generator receiving the pulses arriving at 1 and delivering at its output, which is connected to the line 3, an alternating voltage of which the frequency is a multiple of the number of pulses received at 1 per second.

This alternating voltage acts on a generator 4 which delivers an alternating voltage, the strength of which is proportional to the frequency. On the other hand, by way of the line 5, there is received a signal picked up at the upper part of the drilling assembly. This signal is picked up by means of strain gauges, which measure the vibratory stresses occurring in the rod on account of vibrations emitted by the drilling tool. At the same time, by way of the line 6, there is received a signal representing the accelerations picked up in the upper part of the drilling assembly. The alternating voltage generator 2, through its output 3a, controls two frequency selection filters 7 and 8, which allow the passage of a partial signal in the pass band defined by the two filters 7 and 8, the average frequency of the partial signal being the frequency imposed by the voltage generator 2.

After filtering by the filter 7, the partial signal originating from the line 5 is applied, by way of the line 9, to an adding unit 12. The partial signal originating from the line 6 is applied, after filtering by the filter 8 and by way of the line 10, to an amplifier 11 followed by an integrator 11a. At this moment, there is thus available at the outlet of the integrator 11a, a signal which represents the product of the displacement speed at the upper part of the drilling assembly and the characteristic impedance of the rods, if the adjustment of the amplifier is correct.

This signal is applied to the adding unit 12, as indicated above. In this adding unit 12, the modified partial signal derived from the input 5 and the modified partial signal derived from the input 6 are added together. The resultant thereof is a combined single signal which is of great interest, as will hereinafter be explained. The combined single signal is delivered by way of the line 13 to an amplifier 14 and then by way of the line 15 to a phase-shift device 16. The signal as thus treated is applied, on the one hand, to a rectifier 17 and then to a differential amplifier 18 and, on the other hand, through the line 26, to a phase-shift comparator 28.

Another signal, which is established in a manner which will hereinafter be defined, is applied to the second input of the differential amplifier 18.

As already mentioned, the generator 4 delivers a voltage, the strength of which is proportional to the frequency, and this voltage is applied by way of the line 24, to the input of the variable gain amplifier 23, which amplifies with a given gain, as will hereinafter be explained, the voltage originating from the sinusoidal generator 4.

The amplified voltage from the amplifier 23 is applied through the line 25 to a phase-shift device 30, the phase-shift of which is adjustable.

The resulting signal is applied, by way of the line 31, to delay line 32 which is formed by an assembly comprising modular units disposed in series and each composed of self-inductances and capacitors arranged to form so-called "T-filters."

The voltage resulting from the transformation of the voltage applied (by way of the line 31) to the delay line 32 is applied by way of a line 33 to a fixed earthed resistance or potentiometer 34. The voltage thus obtained is called the generated signal and is supplied, on the one hand, to the second input of the differential amplifier 18 by way of the rectifier 21 and on the other hand to the second input of the phase comparator 28. The voltage difference at the output of the differential amplifier 18 controls the variable gain amplifier 23 by way of the line 19.

In a similar manner, an electrical value proportional to the resultant, at the outlet from the comparator 28, of the two phases supplied through the lines 26 and 27, is supplied by way of the line 29 and serves for regulating the phase-shift device 30.

The amplitude and the phase corresponding to the moment when the collected signal and the generated signal are equal are received on the line 22 by means of the line 35 and on the line 29 by means of the line 36, respectively. The amplitude and the phase are collected by the device 37 and combined, and the direct reading of the rock impedance is obtained at 38. The recording of this value constitutes a geological diagraph which is obtained instantaneously as the drilling advances.

The functioning of this apparatus can be described as follows:

In actual fast, the signal received at the output of the adding unit 12 is of the form $F_D + Z_C V_D$, in which $F_D$ is the force and $V_D$ is the integral of the acceleration, received in the upper part of the drilling assembly. $V_D$ represents the speed of displacement at the upper part of the drilling assembly and $Z_C$ is the impedance which is characteristic of the drilling rods.

The signal which leaves the adding unit 12, after amplification by the device 14 and phase-shift by the device 16, represents the vibratory state at the point of connection of the rods and of the casings therefor, and this makes it possible, in particular, to be free from the impedance of the suspension system of the drilling assembly.

The method under consideration consists in measuring by a comparison procedure the vibratory state at the point of connection of the drill rods and the drill collars and in deducing therefrom the impedance of the rock.

The two components, amplitude and phase, are compared separately in two comparison devices, namely the differential amplifier 18 and the phase comparator 28. The signal coming from the driving shaft of the drilling assembly controls the alternating voltage generator 2 and causes a voltage to be supplied which represents the movement of the drilling tool. The rotation imposed on the drilling assembly causes the movement of the teeth of the tool, and this sets up a train of longituduinal vibrations and torsion, the frequency of which is a multiple of the frequency corresponding to the speed of rotation of the drilling assembly.

The servo-amplifier or generator 4 transforms the voltage delivered by the generator 2, in such a way that the simulation of the operation of the tool is effected with constant displacement, that is to say, the displacement of the tool during each travel from one tooth to the next is constant. The signal leaving the generator 4 and representing the work carried out during this constant displacement is amplified by the amplifier 23 and shifted in phase by the phase-shift device 30, until the signal supplied by way of the delay line 32, and after voltage division by means of the potentiometer 34, is equal to the signal supplied by the phase-shift device 16.

The delay line 32 simulates the drill collars, which have the effect of deforming, delaying and attenuating the signal by factors bearing a fundamental relationship to the geometrical dimensions of the said collars. The increase in the length of the drill collars can be simulated by adding self-inductance-capacitance elements.

The two adjustable elements 23 and 30 represent the behaviour of the rock. Thus results are obtained as a consequence of the electrical-mechanical analogy.

The drilling parameters which have to be applied to the tool, for the drilling operation to be carried out under the best possible conditions, are determined by the mechanical charatceristics of the rock. In particular, a hard rock has to be drilled with a low speed of rotation and a considerable pressure on the tool, whereas a soft rock has to be drilled at a high speed of rotation and with a low pressure on the tool. By determining a mechanical characteristic of the rock, which is connected with its hardness, it is possible to use the result of the measurement in order to control the drilling parameters.

One application of the present invention to the measurement of the characteristics of rocks, in order to allow automation of the drilling, consists in utilising the signal obtained by measuring the mechanical characteristics of the rock for controlling the speed of rotation of the drilling assembly and the control of the pressure applied to the tool.

In one method of carying out this application of the invention, the signal representing the mechanical characteristics of the rock, which is recorded at 38, is used and the said signal is compared with a reference value determining the average positions of the control member of the motor which rotates the drilling assembly and of the brake which controls the unwinding of the cable so as to permit the pressure on the tool to be adjusted.

In another application of the present invention to the automation of drilling, the signal leaving the phase-shift member 16 is collected, its amplitude is compared with a predetermined fixed value and the difference between these two values is utilised for operating the control members of the motor which rotates the drilling assembly and the brake which controls the unwinding of the cable.

This application of the invention will now be described with reference to FIG. 2.

Two curves are shown in FIG. 2, namely the curve 41 and the curve 42. The curve 41 expresses the amplitude of the modified vibrations received at the head of the drilling assembly, as a function of the rotational frequency of the said assembly. The amplitudes vary considerably, passing through a series of maxima with intervening minima.

The curve 41 represents the amplitude for a certain rock characteristic. The curve 42 represents the amplitude of the vibrations received at the head of the drilling assembly for another rock characteristic.

It is thus seen that with a given speed of rotation and with a given rock characteristic, a given amplitude is received. It is thus possible to cause an electric voltage to correspond to this amplitude and to use this as a reference value. The variations relatively to this reference value will be representative of the variations of the mechanical characteristics of the rock within a certain sufficiently wide range for the case of a given lithological formation. The ampltiude variations will thus make it possible to correct within a definite range, the influence of the mechanical characteristics of the rock and in particular to adjust the pressure applied to the tool, if a fixed rotational speed is maintained.

Another modification of this procedure consists in causing the speed of rotation to vary. It is possible at a given instant to carry out a "sweep" in rotational speed; that is to say, it is possible to cause the speed of rotation to vary within a definite range in accordance with a given law. For a given rock characteristic, a portion of the curve 41 is obtained. If the rock characteristics are not those which are expected, the curve 41 becomes a curve such as 42, and the deviations observed make it possible to define the characteristics of the rock, and thus to vary the drilling parameters so as to impose the optimum values on these parameters.

Another way of making the drilling automatic, in accordance with the present invention, consists in measuring the transfer function of the drill collars, as observed at the terminals of the delay line 32 in FIG. 1. In this way, the vibratory state of the collars is determined.

One particularly important application consists in interposing into a series of casings a tool which has a resilient behaviour, for instance, a tool in the nature of a vibration damper, formed of two rigid parts connected by an element of a material having an elastic behaviour, such as rubber, in interposing at a suitable position in the delay line a capacitative element which is in shunt and in finding the maximum vibratory state.

FIG. 3 represents such a capacitative element 43 interposed between two parts 32a and 32b of a delay line simulating the drill collars; the element 43 is connected on the other hand to earth. In order to be placed in the best drilling conditions and to obtain the effect of maximum percussions of the tool, a rotational speed "sweep" is carried out and there is measured the force on entering the assembly formed by the delay lines 32a and 32b and the capacitor 43. The maximum amplitude of the force is sought and then the drilling parameters are established under these conditions.

This application permits, in particular, the use of considerable percussion during rotary drilling, and of obtaining speeds of advance which are decidedly better than those which are obtained in conventional rotary drilling.

We claim:

1. A method of measuring mechanical properties of rock during drilling operations carried out with a rotary drilling assembly having a lower part extending within a drill-hole and an upper part extending from the drill-hole and having at the said lower part, a tool for breaking down the rock, comprising a plurality of cutting elements rendered operative by rotation of the tool, which method is characterized by the following steps:
   (a) receiving, at the upper part of the drilling assembly, at least one signal which is representative of vibrations resulting from displacements and stresses created by the action of the tool on the rock and from the said displacements and stresses being transmitted through the drilling assembly;
   (b) selecting a part of the said received signal, by filtering it by means of a frequency filter having a pass band centered on a frequency defined by the product of the speed of rotation of the drilling assembly and the number of the said cutting elements of the tool;
   (c) generating a signal having at least one characteristic of the same nature as one characteristic of the received signal;
   (d) comparing the generated signal with the said composite signal and producing a difference signal;
   (e) adjusting the amplitude and phase characteristics of the generated signal until the difference signal becomes zero;
   (f) measuring at least one of the said characteristics of the generated signal at the moment when the difference signal is zero;
   (g) correlating the value of the said characteristic or characteristics of the generated signal with the depth of the said tool in the drill-hole.

2. A method according to claim 1, in which said signals are electrical signals.

3. A method according to claim 1, in which the amplitude characteristic of the generated signal, corresponding to the difference signal being zero, is recorded as a function of the depth of the tool in the drill-hole.

4. A method according to claim 1, in which a calculator device is used to establish control values controlling parameters which are imposed on the tool and in which the amplitude of the generated signal, corresponding to the difference signal being zero, is used as an input signal for the said calculator device.

5. A method according to claim 1, in which the amplitude and phase characteristics of a plurality of received signals are measured, the measured values being combined so as to obtain a value indicative of the mechanical properties of the rock.

6. A method according to claim 1, in which a periodic frequency value is established, which is a multiple of the speed of rotation of the drilling assembly, the said valve serving as the said generated signal, controlling by means of the said value a generator delivering a value of which the amplitude is proportional to the frequency, amplifying this amplitude value which is proportional to the frequency by means of an adjustable gain amplifier, regulating the phase of the amplified value by means of an adjustable phase-shift member, applying the resulting value to the input of a network formed of modular units arranged in series and each comprising elements which constitute a resonant circuit and multiplying the signal entering the said network by the transfer function of the said network.

7. A method according to claim 1, in which there are received at the upper part of the drilling assembly, simultaneously but independently of one another, a signal representing strains set up in the upper part of the drilling assembly by vibration of the latter and a signal representing accelerations resulting from vibration of the upper part of the drilling assembly, a part of each of these two signals in the same pass band is selected, the mean frequency of this pass band being equal to the product of the frequency associated with the speed of rotation of the drilling assembly and the number of cutting elements of the tool, the partial signal representing the accelerations is integrated, yielding a partial signal representing the displacement speeds, the said partial signal is amplified, this amplified partial signal and a part of the signal representing the stress are added, the resultant signal is amplified in an adjustable gain amplifier as a function of the length of the drilling assembly, this signal is shifted in phase by an amount related to the length of the drilling assembly, the amplitude of the resulting signal is compared in an amplitude comparator with the amplitude of the said generated signal, yielding a difference signal which is applied to an integrator, the integrated difference signal is used for controlling the gain of the variable gain amplifier, the phase of the resulting signal is compared in a phase comparator with the phase of the said generated signal, the difference signal is used for regulating the phase-shift of the adjustable phase-shift device, and the gain of the variable gain amplifier and the phase shift of the phase-shift device are measured independently.

8. In drilling apparatus for drilling rock, and comprising a rotary drilling assembly having a lower part adapted to extend within a drill-hole and an upper part adapted to extend from the drill-hole and having at the said lower part a tool for breaking down the rock, means for measuring the mechanical properties of the rock during drilling, characterised by pick-up devices at the said upper part of the drilling assembly for establishing a voltage representative of vibrations of the said upper part, an alternating voltage generator adapted to be controlled by pulses and to deliver an alternating voltage with a frequency which is a multiple of the number of pulses received per second, two filters having the same pass band and adapted to have applied thereto, the frequency of the said generator, a current generator connected to be controlled by the alternating voltage generator for delivering a current proportional to the frequency, a variable gain amplifier for amplifying the said current, an adjustable phase-shift device for altering the phase of the said amplified current, a delay line for multiplying the said amplified and dephased current by a transfer function which is adjustable as a function of the geometrical parameters of the drilling assembly, comparison devices for receiving, on the one hand, the voltage from the delay line and, on the other hand, a voltage established from voltages from the said pick-ups by simultaneous filtering by the said filters under the control of the alternating voltage generator, an integrator and an amplifier adapted to have one of the filtered voltages applied thereto and an adding unit adapted to receive the other voltage originating from a second one of the pick-ups and an amplifier and a phase-shift device following the said adding unit.

9. An automatic drilling method using a rotary drilling assembly having a lower part extending within a drill-hole and an upper part extending from the drill-hole and having at the said lower part, a tool for breaking down rock in the drill-hole, comprising a plurality of cutting elements rendered operative by rotation of the tool, which method comprises measuring mechanical properties of the rock by means of the following steps:
   (a) receiving, at the upper part of the drilling assembly, a plurality of signals which are representative of vibrations resulting from displacements and stresses created by the action of the tool on the rock and from the said displacements and stresses being transmitted through the drilling assembly;
   (b) selecting a part of each of the said received signals, by filtering them by means of a frequency filter having a pass band centered on a frequency defined by the product of the speed of rotation of the drilling assembly and the number of the said cutting elements of the tool;
   (c) combining together the selected parts of the said signals to form a composite signal;
   (d) generating a signal having the same nature as the received signals;
   (e) comparing the generated signal with the said composite signal and producing a difference signal;
   (f) adjusting the amplitude and phase characteristics of the generated signal until the difference signal becomes zero;
   (g) measuring at least one of the said characteristics of the generated signal at the moment when the difference signal is zero;
   (h) correlating the value of the said characteristic or characteristics of the generated signal with the depth of the said tool in the drill-hole; and then comparing the amplitude of the generated signal, at the moment of equality of the latter and of the received signal, and using the difference to control devices which determine the parameters of the drilling operation.

10. A drilling method according to claim 9, consisting in detecting the amplitude of a generated signal at the input to a delay line, determining the maximum value of the signal as a function of the speed of rotation of the drilling equipment and maintaining the speed of rotation at the value giving the maximum amplitude.

11. A drilling method according to claim 10, in which a tool of elastic behaviour is used, which is interposed in the assembly of drilling collars, the method consisting in determining the maximum amplitude of a generated signal generated at the entry to the delay line and in maintaining the drilling parameters at values such that this amplitude remains at a maximum.

12. A drilling method according to claim 11, in which the mechanical impedance of the drilled rock is continuously recorded, thus establishing an instantaneous log of the progress of the drilling, and this log is used for geological interpretation.

References Cited

UNITED STATES PATENTS

| | | | |
|---|---|---|---|
| 2,544,569 | 3/1951 | Silverman | 175—50 |
| 2,620,386 | 12/1952 | Alspaugh et al. | 175—50 |
| 2,752,591 | 6/1956 | Felbeck et al. | 175—50 |
| 2,790,968 | 4/1957 | Cook et al. | 175—50 |
| 3,115,942 | 12/1963 | Arps | 175—50 |

JAMES A. LEPPINK, Primary Examiner

U.S. Cl. X.R.

73—151; 175—50

UNITED STATES PATENT OFFICE
CERTIFICATE OF CORRECTION

Patent No. 3,520,375          Dated   July 14, 1970

Inventor(s) J. RAYNAL et al

It is certified that error appears in the above-identified patent and that said Letters Patent are hereby corrected as shown below:

Claims priority, application France, March 22, 1968, P.V.No. 145,020.

SIGNED AND
SEALED

FEB 23 1971

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,520,375         Dated July 14, 1970

Inventor(s) J. RAYNAL et al

It is certified that error appears in the above-identified patent and that said Letters Patent are hereby corrected as shown below:

Claims priority, application France, March 22, 1968, P.V.No. 145,020.

SIGNED AND
SEALED

FEB 23 1971

(SEAL)
Attest:

Edward M. Fletcher, Jr.
Attesting Officer

WILLIAM E. SCHUYLER, JR.
Commissioner of Patents